(12) United States Patent
Cho

(10) Patent No.: US 9,791,963 B2
(45) Date of Patent: Oct. 17, 2017

(54) METHOD AND APPARATUS FOR DETECTING USER INPUT IN AN ELECTRONIC DEVICE

(71) Applicant: Samsung Electronics Co., Ltd., Gyeonggi-do (KR)

(72) Inventor: Sung-Jae Cho, Seoul (KR)

(73) Assignee: Samsung Electronics Co., Ltd (KR)

( * ) Notice: Subject to any disclaimer, the term of this patent is extended or adjusted under 35 U.S.C. 154(b) by 47 days.

(21) Appl. No.: 14/639,192

(22) Filed: Mar. 5, 2015

(65) Prior Publication Data
US 2015/0253923 A1    Sep. 10, 2015

(30) Foreign Application Priority Data

Mar. 5, 2014    (KR) .................. 10-2014-0025850

(51) Int. Cl.
   *G06F 3/041*    (2006.01)
   *G06F 3/0488*   (2013.01)
   *G09G 3/20*     (2006.01)

(52) U.S. Cl.
   CPC .......... *G06F 3/0416* (2013.01); *G06F 3/0488* (2013.01); *G06F 3/04886* (2013.01); *G09G 3/2096* (2013.01)

(58) Field of Classification Search
   CPC .... G06F 3/0416; G06F 3/0488; G06F 3/2096; G06F 3/04886
   USPC ......... 345/156–184, 660, 672; 359/265, 270, 359/272, 273; 701/533
   See application file for complete search history.

(56) References Cited

U.S. PATENT DOCUMENTS

| | | | | |
|---|---|---|---|---|
| 2005/0275626 A1* | 12/2005 | Mueller | ............... | H05B 37/029 345/156 |
| 2008/0192024 A1* | 8/2008 | Mita | ...................... | G06F 3/044 345/173 |
| 2008/0216001 A1 | 9/2008 | Ording et al. | | |
| 2009/0139778 A1* | 6/2009 | Butler | ................... | G06F 1/1626 178/18.03 |
| 2010/0026656 A1* | 2/2010 | Hotelling | ................ | G06F 3/044 345/174 |

(Continued)

FOREIGN PATENT DOCUMENTS

| | | |
|---|---|---|
| JP | 2013-077285 | 4/2013 |
| KR | 1020100049822 | 5/2010 |
| KR | 1020130061527 | 6/2013 |

OTHER PUBLICATIONS

European Search Report dated Aug. 11, 2015 issued in counterpart application No. 15157858.0-1972, 7 pages.

(Continued)

*Primary Examiner* — Prabodh M Dharia
(74) *Attorney, Agent, or Firm* — The Farrell Law Firm, P.C.

(57) ABSTRACT

A method and an electronic device for detecting a user input in the electronic device are provided. The method includes acquiring information regarding a user interface object to be displayed on a touch screen panel; setting, based on the information, a partial area that is at least a part of a touch detection area corresponding to the user interface object; and adjusting a touch detection sensitivity of the partial area to be greater than a touch detection sensitivity of the touch screen panel.

23 Claims, 14 Drawing Sheets

(56) References Cited

U.S. PATENT DOCUMENTS

| | | | |
|---|---|---|---|
| 2010/0149126 A1* | 6/2010 | Futter | G06F 1/3231 345/174 |
| 2010/0153876 A1 | 6/2010 | Kim et al. | |
| 2010/0197353 A1* | 8/2010 | Marui | G06F 3/04886 455/566 |
| 2010/0245263 A1* | 9/2010 | Parada, Jr. | G06F 3/041 345/173 |
| 2011/0022307 A1* | 1/2011 | Lee | G01C 21/3664 701/533 |
| 2011/0037725 A1* | 2/2011 | Pryor | G01C 21/3664 345/174 |
| 2011/0053641 A1* | 3/2011 | Lee | G06F 1/1626 455/556.1 |
| 2011/0082616 A1* | 4/2011 | Small | B60K 35/00 701/31.4 |
| 2011/0083110 A1 | 4/2011 | Griffin et al. | |
| 2011/0163982 A1* | 7/2011 | Wadia | G06F 3/044 345/173 |
| 2011/0227858 A1* | 9/2011 | An | G06F 3/044 345/174 |
| 2011/0298940 A1* | 12/2011 | Cheong | H04M 1/72522 348/222.1 |
| 2011/0313870 A1* | 12/2011 | Eicher | G06Q 20/20 705/16 |
| 2011/0316679 A1 | 12/2011 | Pihlaja | |
| 2012/0050180 A1* | 3/2012 | King | G06F 3/0416 345/173 |
| 2012/0068941 A1 | 3/2012 | Arrasvuori et al. | |
| 2012/0069002 A1* | 3/2012 | Kuribayashi | G06T 19/00 345/419 |
| 2012/0105368 A1* | 5/2012 | Kobayashi | G06F 3/044 345/174 |
| 2012/0109455 A1* | 5/2012 | Newman | G06F 3/03547 701/36 |
| 2012/0127179 A1* | 5/2012 | Aspelin | G06F 21/32 345/441 |
| 2012/0182224 A1* | 7/2012 | Waas | G06F 3/04883 345/173 |
| 2012/0239673 A1* | 9/2012 | Yun | G06F 17/30247 707/758 |
| 2013/0002706 A1* | 1/2013 | Rezende | G06F 3/04845 345/619 |
| 2013/0023248 A1* | 1/2013 | Lee | H04W 4/026 455/414.1 |
| 2013/0076632 A1* | 3/2013 | Sirpal | G06F 3/1438 345/168 |
| 2013/0093712 A1 | 4/2013 | Liu et al. | |
| 2013/0154982 A1* | 6/2013 | Hotelling | G06F 3/0485 345/173 |
| 2013/0155070 A1 | 6/2013 | Luo | |
| 2013/0219319 A1* | 8/2013 | Park | G06F 3/0488 715/775 |
| 2013/0249950 A1* | 9/2013 | Mahmoud | G06F 3/0488 345/660 |
| 2013/0300668 A1* | 11/2013 | Churikov | G06F 3/041 345/168 |
| 2013/0304795 A1* | 11/2013 | Kang | H04L 67/10 709/202 |
| 2014/0043259 A1* | 2/2014 | Park | G06F 3/0412 345/173 |
| 2014/0123002 A1* | 5/2014 | Wessling | G06F 17/241 715/273 |
| 2014/0198064 A1* | 7/2014 | Kim | G06F 3/044 345/173 |
| 2014/0253498 A1* | 9/2014 | Suzuki | G06F 3/044 345/174 |
| 2014/0267104 A1* | 9/2014 | Ahmed | G06F 3/041 345/173 |
| 2014/0282269 A1* | 9/2014 | Strutt | G06F 3/04886 715/863 |
| 2014/0347294 A1* | 11/2014 | Hong | G06F 1/3262 345/173 |
| 2015/0035781 A1* | 2/2015 | Oshinome | G06F 3/0488 345/173 |
| 2015/0054780 A1* | 2/2015 | Manba | G06F 3/044 345/174 |
| 2015/0103035 A1* | 4/2015 | Kim | G06F 3/041 345/174 |
| 2015/0130725 A1* | 5/2015 | Knepper | G06F 1/1643 345/173 |
| 2015/0169114 A1* | 6/2015 | King | G06F 3/0416 345/174 |
| 2015/0212644 A1* | 7/2015 | Noto | G06F 3/044 345/174 |
| 2015/0212724 A1* | 7/2015 | Manba | G06F 3/0488 715/794 |
| 2015/0309656 A1* | 10/2015 | Ichikawa | G06F 3/0416 345/174 |
| 2015/0363040 A1* | 12/2015 | Nagata | G06F 3/04883 345/173 |
| 2016/0054846 A1* | 2/2016 | Lee | G06F 3/0416 345/174 |
| 2016/0132135 A1* | 5/2016 | Oda | G06F 3/03545 345/174 |

OTHER PUBLICATIONS

International Search Report dated May 26, 2015 issued in counterpart application No. PCT/KR2015/002153.

* cited by examiner

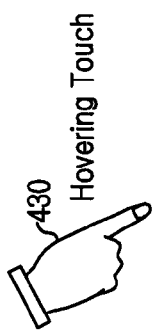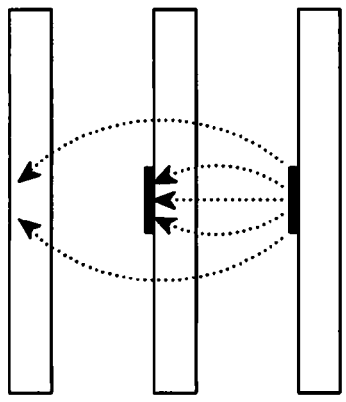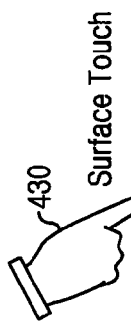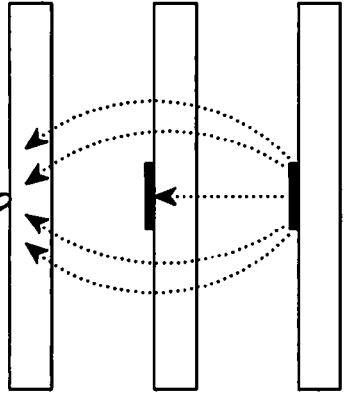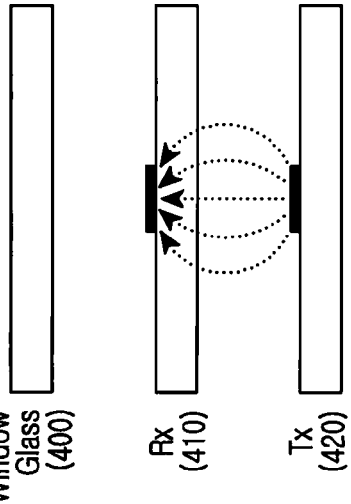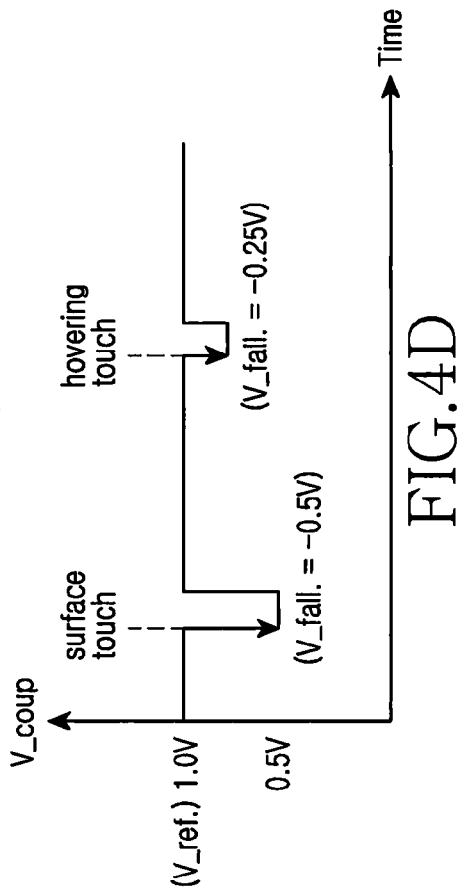

Hovering Touch Detection Control Information

| enrty | operation | hovering touch detection area | | touch detection sensitivity | |
|---|---|---|---|---|---|
| | | | | finger | pen |
| screen context 1 | text message preview (500) | area 1 | (x#,y#)~(x#,y#) | 150% | 140% |
| | | area 2 | (x#,y#)~(x#,y#) | | |
| | | area 3 | (x#,y#)~(x#,y#) | | |
| | | -- | -- | -- | -- |
| screen context 2 | progress preview (510) | area 1 | (x#,y#)~(x#,y#) | 180% | 170% |
| | | area 2 | (x#,y#)~(x#,y#) | | |
| | | area 3 | (x#,y#)~(x#,y#) | 200% | 190% |
| | | -- | -- | -- | -- |
| screen context 3 | speed dial preview (520) | area 1 | (x#,y#)~(x#,y#) | 150% | 140% |
| | | area 2 | (x#,y#)~(x#,y#) | | |
| | | area 3 | (x#,y#)~(x#,y#) | | |
| | | -- | -- | -- | -- |
| ⋮ | ⋮ | ⋮ | ⋮ | ⋮ | ⋮ |

FIG.5

METHOD AND APPARATUS FOR DETECTING USER INPUT IN AN ELECTRONIC DEVICE

PRIORITY

This application claims priority under 35 U.S.C. §119(a) to Korean Patent Application Serial No, 10-2014-0025850 filed in the Korean Intellectual Property Office on Mar. 5, 2014, the entire content of which is incorporated herein by reference.

BACKGROUND OF THE INVENTION

1. Field of the Invention

This present invention relates generally to an electronic device, and more particularly, to a method and apparatus for detecting a user input in an electronic device.

2. Description of the Related Art

Various types of certain electronic devices, such as smart-phones or tablet Personal Computers (PCs), generally include a Touch Screen Panel (TSP).

FIGS. 1A and 1B are diagrams illustrating a surface touch and a hovering touch on a touch screen panel.

As illustrated in FIGS. 1A and 1B, a user may perform input on a touch screen panel 100 by using various input tools (for example, a finger 111 or a pen). For example, the user may perform an input that contacts a surface of the touch screen panel 100 (for example, a surface touch), or an input that is close to, but does not contact, the surface of the touch screen panel 100 (for example, a hovering touch).

For example, a pen, which is one of the input tools, may be an electronic pen that allows the touchscreen panel to detect a pen touch. Also, an input that does not contact a surface of the touch screen panel, may be called as a floating touch or the like, which may also be referred to as a "hovering touch".

The electronic device may detect a surface touch of the touch screen panel or may detect a surface touch and a hovering touch when detecting an input of a touch screen panel using the input tool. For example, in order to detect the surface touch and the hovering touch, it is possible to increase a touch detection sensitivity for touch detection of the touch screen panel to be greater than a sensitivity for touch detection when the surface touch is detected.

As described above, when the sensitivity for touch detection of the touch screen panel increases, power consumption may increase. Also, when a touch detection sensitivity of the full area of the touch screen panel is adjusted to increase, the power consumption may rapidly increase.

SUMMARY OF THE INVENTION

Accordingly, the present invention has been made to address at least the problems and/or disadvantages described above and to provide at least the advantages described below.

An aspect of the present invention provides a method for detecting a user input in an electronic device and the electronic device which resolves the above problem.

According to an aspect of the present invention, a method for operating an electronic device is provided. The method includes acquiring information regarding a user interface object to be displayed on a touch screen panel; setting, based on the information, a partial area that is at least a part of a touch detection area corresponding to the user interface object; and adjusting a touch detection sensitivity of the partial area to be greater than a touch detection sensitivity of the touch screen panel.

According to another aspect of the present invention, an electronic device is provided. The electronic device includes a touch screen panel that detects a surface touch and a hovering touch; and a processor that adjusts a detection sensitivity of the touch screen panel, wherein the processor sets a partial area that is at least a part of a touch detection area corresponding to the user interface object based on information related to a user interface object to be displayed on the touch screen panel and adjusts a touch detection sensitivity of the partial area to be greater than a touch detection sensitivity of the touch screen panel.

According to another aspect of the present invention, a non-transitory computer-readable recording medium that stores a program which, when executed by a computer, performs a method for operating an electronic device is provided. The method includes acquiring information regarding a user interface object to be displayed on a touch screen panel; setting, based on the information, a partial area that is at least a part of a touch detection area corresponding to the user interface object; and adjusting a touch detection sensitivity of the partial area to be greater than a touch detection sensitivity of the touch screen panel.

BRIEF DESCRIPTION OF THE DRAWINGS

The above and other aspects, features and advantages of the certain embodiments of the present invention will be more apparent from the following detailed description when taken in conjunction with the accompanying drawings in which:

FIGS. 4A to 4D are diagrams illustrating states of a surface touch and a hovering touch on a capacitive touch screen panel according to various embodiments of the present invention;

FIG. 5 is a diagram illustrating a configuration of hovering touch detection control information according to various embodiments of the present invention;

DETAILED DESCRIPTION OF THE EMBODIMENTS OF THE PRESENT INVENTION

Figure 1A:
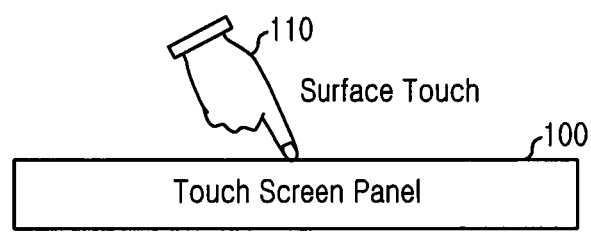
FIGS. 1A and 1B are diagrams illustrating a surface touch and a hovering touch on a touch screen panel.
Figure 1B:
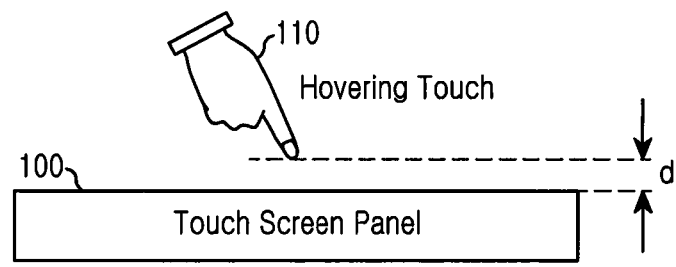

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness. In the drawings, same or similar reference numerals may denote the same or similar elements.

Terms such as "includes" and "may include", when used herein, specify the presence of stated features, operations, or elements, but do not limit additional functions, operations or elements. It will be understood that terms such as "comprise", "include", and "have", when used herein, specify the presence of stated features, integers, steps, operations, elements, components, or combinations thereof, but do not preclude the presence or addition of other features, integers, steps, operations, elements, components, or combinations thereof.

The term "or" as used herein is to be interpreted as an inclusive or meaning any one or any combination. For example, "A or B" may be intended to include A, to include B, or to include both A and B." Although terms such as "first" and "second" may be used herein to describe various elements, these elements should not be limited by these terms. For example, the terms do not limit the order and/or importance of the elements. These terms are only used to distinguish one element from another element. For example, a first user equipment and a second user equipment are each a user equipment and represent different user equipments. For example, a first element may be referred to as a second element, and, similarly, a second element may be referred to as a first element, without departing from the scope of various embodiments of the present invention.

It will also be understood that when an element is referred to as being "connected" or "coupled" to another element, the element can be directly connected or coupled to the other element or intervening elements may be present. By contrast, when an element is referred to as being "directly connected" or "directly coupled" to another element, there are no intervening elements present.

The terminology used herein with respect to various embodiments of the present invention is for the purpose of describing particular embodiments and is not intended to be limiting of the embodiments of the present invention. As used herein, the singular forms "a", "an", and "the" are intended to include the plural forms as well, unless the context clearly indicates otherwise. Unless otherwise defined, all terms (including technical and scientific terms) used herein have the same meaning as commonly understood by one of ordinary skill in the art to which various embodiments of the present invention belongs. It will be further understood that terms, such as those defined in commonly used dictionaries, should be interpreted as having definitions that are consistent with their definitions in the context of the relevant art and will not be interpreted in an idealized or overly formal sense unless expressly so defined in embodiments of the present invention.

An electronic device according to various embodiments of the present invention may be a device having a touch function. Examples of such an electronic device include a smart phone, a tablet personal computer, a mobile phone, a video telephone, an e-book reader, a desktop personal computer, a laptop personal computer, a netbook computer, a Personal Digital Assistant (PDA), a portable multimedia player, a Motion Picture Experts Group (MPEG) Audio Layer 3 (MP3) player, a mobile medicine equipment, a camera, or a wearable device (for example, a Head-Mounted-Device (HMD), such as an electronic glasses, an electronic clothing, an electronic bracelet, an electronic necklace, an electronic appcessory, an electronic tattoo, or a smart watch).

In some embodiments of the present invention, the electronic device may be a smart home appliance having a touch function. Examples of such a smart home appliance include a television, a Digital Video Disk (DVD) player, a stereo, a refrigerator, an air-conditioner, a cleaner, an oven, a microwave oven, a washing machine, an air cleaner, a set-top box, a TeleVision (TV) box (e.g., Samsung HomeSync™, Apple TV™, or Google TV™), a game console, an electronic dictionary, an electronic key, a camcorder, or a digital photo frame.

According to some embodiments of the present invention, the electronic device may include various types of medical equipments (for example, Magnetic Resonance Angiography (MRA), Magnetic Resonance Imaging (MRI), Computed Tomography (CT), an imaging device, or an ultrasound imaging device), a navigation device, a Global Positioning System (GPS) receiver, an Event Data Recorder (EDR), a Flight Data Recorder (FDR), a vehicle infotainment device, a ship electronic equipment (for example, a ship navigation device or a gyro-compass device), an avionics device, a security equipment, a head unit for vehicle, a industrial robot, a home robot, an Automatic Teller's Machine (ATM) of the financial institution, or a Point of Sales (POS) device of a store.

According to some embodiments of the present invention, the electronic device may include any of furniture, a portion of a building/structure, an electronic board, an electronic signature receiving device, a projector, or various types of meters (for example, water, electricity, gas, or radio wave), each of which has a touch function. An electronic device according to various embodiments of the present invention may be a combination of one or more of the above-described devices. An electronic device according to various embodiments of the present invention may be a flexible device. In addition, an electronic device according to various embodiments of the present invention is not limited to the above-described devices. An electronic device according to various embodiments of the present invention is described below with reference to accompanying drawings. The term "user", as used herein, may refer to a human being using the electronic device or an apparatus (e.g., an artificial intelligence electronic device) using the electronic device.

Figure 2:
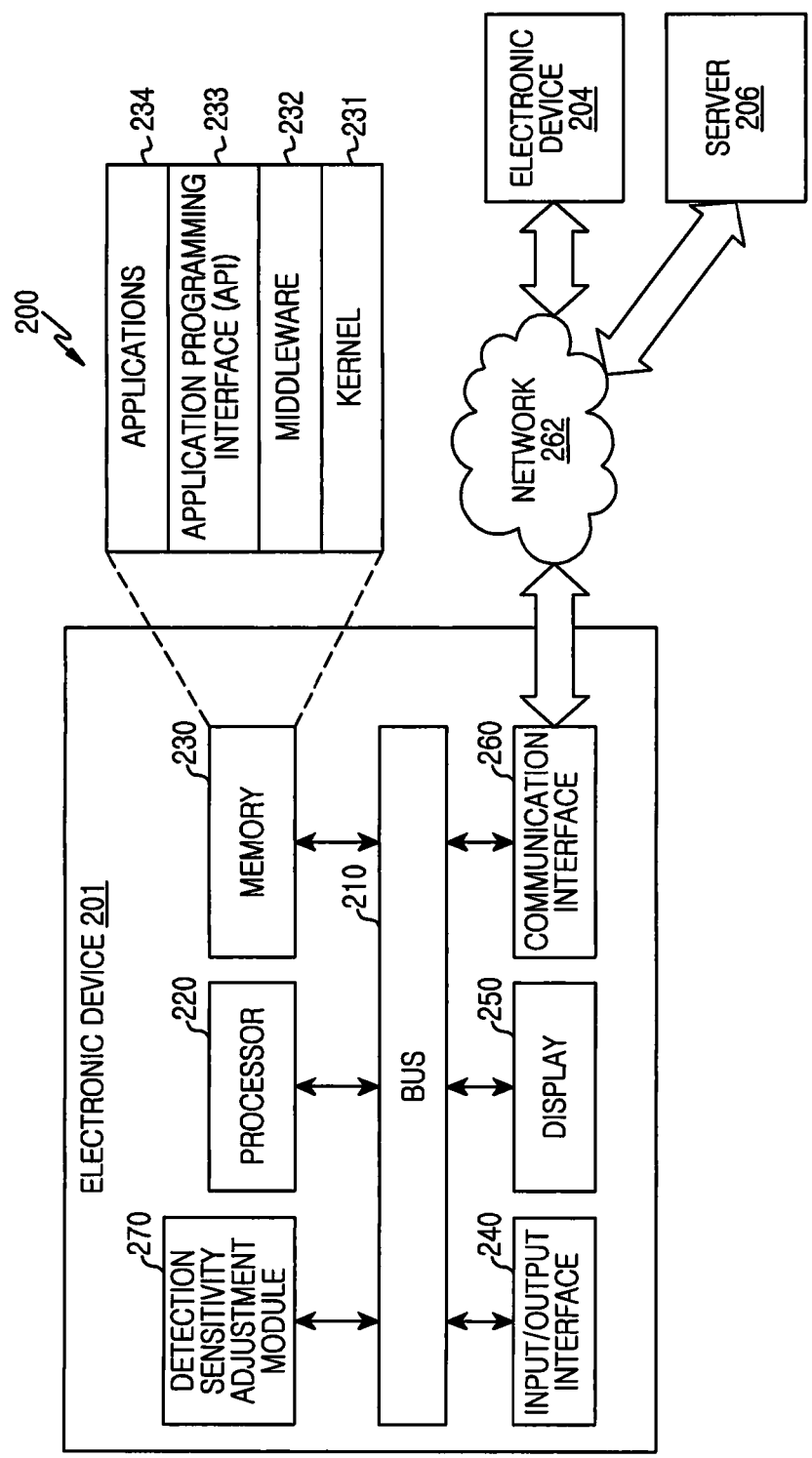
FIG. 2 is a block diagram of an electronic device according to various embodiments of the present invention.

FIG. 2 is a diagram illustrating a network environment including an electronic device according to various embodiments of the present invention.

Referring to FIG. 2, an electronic device 201 includes a bus 210, a processor 220, a memory 230, an input/output interface 240, a display 250, a communication interface 260, and a detection sensitivity adjustment module 270. The bus 210 is a circuit that connects the above-described elements to one another and transfers communication (for example, control message) between the above-described elements.

The processor 220 receives an instruction from another component of the electronic device 201 (e.g., the memory 230, the input/output interface 240, the display 250, or the communication interface 260, or the detection sensitivity adjustment module 270) through, for example, the bus 210, decodes the received instruction, and performs data operations or data processing according to the decoded instruction.

The memory 230 stores an instruction or data received from or generated by the processor 220 or other elements (for example, the input/output interface 240, the display 250, the communication interface 260, or the detection sensitivity adjustment module 270). The memory 230 includes programming modules, for example, a kernel 231, middleware 232, an Application Programming Interface (API) 233, and an application 234. The programming modules may be configured by software, firmware, hardware, or a combination thereof.

The kernel 231 controls or manages system resources (e.g., the bus 210, the processor 220, or the memory 230) used to execute an operation or function implemented by other programming modules, (e.g., the middleware 232, the API 233, or the application 234). The kernel 231 provides an interface that allows the middleware 232, the API 233, or the application 234 to access and then control or manage respective elements of the electronic device 201.

The middleware 232 performs a relay role, such that the API 233 or the application 234 communicates with the kernel 231, and transmits and receives data with the kernel 231. In addition, the middleware 232 may perform control (e.g., scheduling or load balancing) for task requests received from the applications 234 by using, for example, a method for assigning a priority of using the system resources (e.g., the bus 210, the processor 220, or the memory 230) of the electronic device 201 to at least one application of the applications 234 with respect to the task requests. The API 233 is an interface for allowing the applications 234 to control functions provided by the kernel 231 or the middleware 232 and may include, for example, an interface or function (e.g., a command) for file control, window control, image processing, or text message control.

According to various embodiments of the present invention, the application 234 may include a Short Message Service (SMS)/a Multimedia Messaging Service (MMS) application, an E-mail application, a calendar application, an alarm application, a health-care application (e.g., an application for measuring a quantity of motion, a blood sugar, and/or the like), an environment informing application (e.g., an application for providing information on an atmospheric pressure, a humidity, a temperature, and/or the like), an application for determining a context of the electronic device 101, and/or the like. Additionally or alternatively, the application 234 may be an application relating to information exchange between the electronic device 201 and an external electronic device (e.g., an electronic device 204). An application relating to the information exchange between the electronic device 101 and the external electronic device may include, for example, a notification relay application for transferring specific information to the external electronic device, a device management application for managing the external electronic device, and/or the like.

For example, the notification relay application includes a function of transferring notification information, which is provided by other applications (e.g., the SMS/MMS application, the E-mail application, the health-care application, the environment information application, and/or the like of the electronic device 201), to the external electronic device 204. Additionally or alternatively, the notification relay application may receive notification information from, for example, the external electronic device 204 and provide the notification information to a user. The device management application performs management (for example, installation, un-installation or updating) of a function (for example, the turn-on or turn-off of an external electronic device (or one or more components), or displays brightness (or resolution) control) associated with at least a part of the external electronic device 204 that communicates with the electronic device 201, an application executed in the external electronic device, and a service (for example, call service or message service) provided by the external electronic device.

According to various embodiments of the present invention, the application 234 may include a specified application according to a property of the external electronic device 204 (e.g., a type of the electronic device 204). For example, if the external electronic device is an MP3 player, then the application 234 may include an application related to a reproduction of music. Similarly, if the external electronic device is a mobile medical appliance, then the application 234 may include an application related to a healthcare. According to an embodiment of the present invention, the application 234 may include an application specified in the electronic device 201 and an application received from the external electronic device (e.g., a server 206 or the electronic device 204).

The input/output interface 240 transfers an instruction or data input by a user through the input/output device (e.g., a sensor, a keyboard, or a touch screen) to the processor 220, the memory 230, the communication interface 260, or the detection sensitivity adjustment module 270 through, for example, the bus 210. For example, the input/output interface 240 provides data for a user's touch input through a touch screen to the processor 220 or the detection sensitivity adjustment module 270. Further, the input/output interface 240 outputs instructions or data, which are received through the bus 210 from the processor 220, the memory 230, the communication interface 260, or the detection sensitivity adjustment module 270, through the input/output device (e.g., a speaker or a display). For example, the input/output interface 240 may output voice data, which is processed by the processor 220, to the user through the speaker.

The display 250 displays various information (e.g. multimedia data, text data, and/or the like), to the user. The communication interface 260 connects communications between the electronic device 201 and an external device 204 or 206. For example, the communication interface 260 may be connected to a network 262 by wireless communication or wired-cable communication and may communicate with the external device. The wireless communication may include at least one of, for example, Wireless Fidelity (WiFi), BlueTooth (BT), Near Field Communication (NFC), Global Positioning System (GPS), cellular communication (e.g., Long Term Evolution (LTE), Long Term Evolution-Advanced (LTE-A), Code Division Multiple Access (CDMA), Wideband Code Division Multiple Access (WCDMA), Universal Mobile Telecommunications System (UMTS), Wireless Broadband (WiBro), Global System for Mobile Communications (GSM), and/or the like). The wired communication may include, for example, a Universal Serial Bus (USB), a High Definition Multimedia Interface (HDMI), a Recommended Standard 232 (RS-232), a Plain Old Telephone Service (POTS), and/or the like.

According to an embodiment of the present invention, the network 262 may be a telecommunications network. The communication network may include a computer network, Internet, Internet of Things, and/or a telephone network. According to an embodiment of the present invention, a protocol for communication between the electronic device 201 with an external device (e.g., a transport layer protocol, data link layer protocol, or a physical layer protocol), may be supported by, for example, the application 234, the API 233, the middleware 232, the kernel 231, and/or the communication interface 260.

The detection sensitivity adjustment module 270 processes at least a part of information acquired from other elements (e.g., the processor 220, the memory 230, the input/output interface 240, or the communication interface 260) and provides the part of the acquired information to a user according to various methods. For example, the detection sensitivity adjustment module 270 may acquire information regarding a user interface object to be displayed on the display 250 and adjust a detection sensitivity related to a touchscreen through the input/output interface 240. According to an implementation example, detection sensitivity adjustment module 270 may be included as a portion of the processor 220. The detection sensitivity adjustment module 270 is described herein below.

For example, the electronic device 201 may include a touch screen panel that detects a surface touch and a hovering touch, and a processor that adjusts a detection sensitivity of the touch screen panel, wherein the processor sets a partial area that is at least a part of a touch detection area corresponding to the user interface object based on information related to a user interface object to be displayed on the touch screen panel and adjusts a touch detection sensitivity of the partial area to be greater than a touch detection sensitivity of the touch screen panel.

Figure 3:
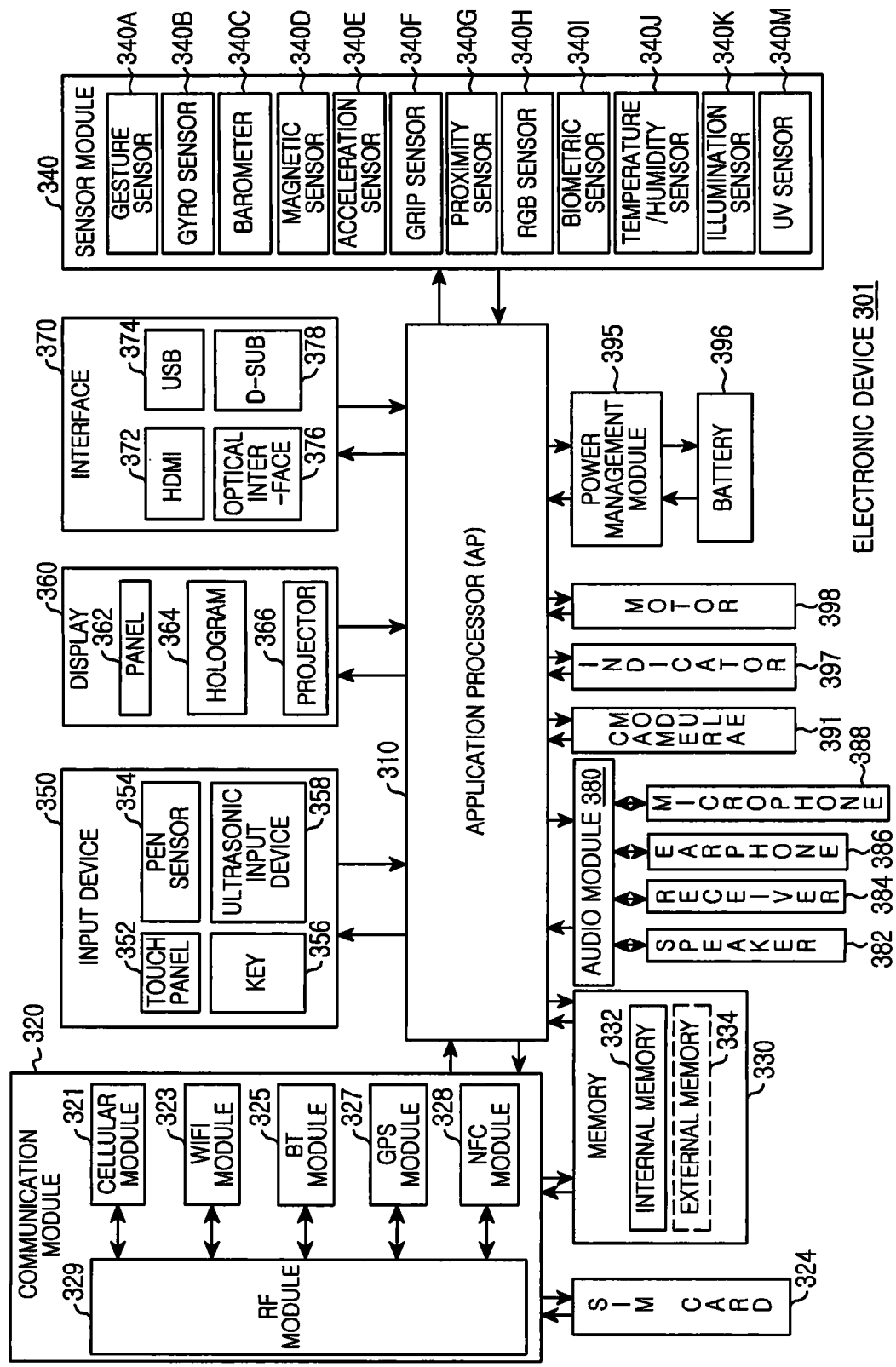
FIG. 3 is a block diagram of hardware according to various embodiments of the present invention.

FIG. 3 is a diagram illustrating a block diagram illustrating an electronic device according to various embodiments of the present invention.

Referring to FIG. 3, an electronic device 301 may form all of or a part of the electronic device 201 illustrated in FIG. 2, for example. Referring to FIG. 3, the electronic device 301 include at least one Application Processor (AP) 310, a communication module 320, a Subscriber Identification Module (SIM) card 324, a memory 330, a sensor module 340, an input device 350, a display 360, an interface 370, an audio module 380, a camera module 391, a power management module 395, a battery 396, an indicator 397, and a motor 398.

The AP 310 executes an operating system or application programs to control a plurality of hardware or software components connected to the AP 310, and performs data processing and arithmetic operations on various types of data including multimedia data. The AP 310 may be implemented by using, for example, a System on Chip (SoC). According to an embodiment of the present invention, the AP 310 may further include a Graphics Processing Unit (GPU).

The communication module 320 (e.g., the communication interface 260) performs data transmission and reception during communication between the electronic device 201 and other electronic devices (for example, the electronic device 204 or the server 206) connected to the electronic device 301 via a network. According to an embodiment of the present invention, the communication module 320 includes a cellular module 321, a WiFi module 323, a BlueTooth (BT) module 325, a GPS module 327, an NFC module 328, and a Radio Frequency (RF) module 329.

The cellular module 321 provides a voice call service, a video call service, a short messaging service, an Internet service, or the like through a communication network (for example, LTE, LTE-A, CDMA, WCDMA, UMTS, WiBro, or GSM) The cellular module 321 performs identification and authentication of electronic devices in a communication network by using, for example, a SIM module (e.g., the SIM card 324). According to an embodiment of the present invention, the cellular module 321 performs at least one of functions which the AP 310 is capable of providing. For example, the cellular module 321 may perform at least a part of a multimedia control function.

According to an embodiment of the present invention, the cellular module 321 may include a Communication Processor (CP). The cellular module 321 may be implemented by using, for example, an SoC. Although the cellular module 321 (e.g., a communication processor), the memory 330, or the power management module 395, is illustrated as being separate from the AP 310 in FIG. 3, the AP 310 may be implemented to include at least one (for example, the cellular module 321) of the above-described elements according to an embodiment of the present invention.

According to an embodiment of the present invention, the AP 310 or the cellular module 321 (e.g., a communication processor) loads a command or data, received from at least one of a non-volatile memory and other elements connected thereto, into a volatile memory and process the same. The AP 310 or the cellular module 321 may store data received from or generated by at least one of other elements in the non-volatile memory.

Each of the WiFi module 323, the BT module 325, the GPS module 327, and the NFC module 328 may include a processor for processing data transmitted and received therethrough. Although the cellular module 321, the WiFi module 323, the BT module 325, the GPS module 327, and the NFC module 328 are illustrated as separate blocks in FIG. 3, two or more of the cellular module 321, the WiFi module 323, the BT module 325, the GPS module 327, and the NFC module 328 may be included in one Integrated Chip (IC) or one IC package. For example, two or more processors respectively corresponding to the cellular module 321, the WiFi module 323, the BT module 325, the GPS module 327, and the NFC module 328 (for example, a communication processor corresponding to the cellular module 321 and a WiFi processor corresponding to the WiFi module 323) may be implemented using one SoC.

The RF module 329 performs transmission and reception of data, for example, transmission and reception of RF signals. Although not illustrated, the RF module 329 may include, for example, a transceiver, a Power Amplifier Module (PAM), a frequency filter, or a Low Noise Amplifier (LNA). The RF module 329 may further include a component for transmitting and receiving electromagnetic waves to and from free air for wireless communication, for example, a conductor or a conductive wire. Although the cellular module 321, the WiFi module 323, the BT module 325, the GPS module 327, and the NFC module 328 are illustrated as sharing one RF module 329 in FIG. 3, any of the cellular module 321, the WiFi module 323, the BT module 325, the GPS module 327, and the NFC module 328 may perform transmission and reception of RF signals through a separate RF module.

The SIM card 324 includes a subscriber identification module, and may be inserted into a slot formed at a specific position of the electronic device. The SIM card 324 includes unique identification information (for example, Integrated Circuit Card IDentifier (ICCID)) or subscriber information (for example, International Mobile Subscriber Identity (IMSI)).

The memory 330 (for example, the memory 230) includes an internal memory 332 and an external memory 334. The internal memory 332 may include any of, for example, a volatile memory (e.g., a Dynamic RAM (DRAM), a Static RAM (SRAM), or a Synchronous Dynamic RAM (SDRAM)) or a non-volatile memory (for example, a One Time Programmable ROM (OTPROM), a Programmable ROM (PROM), an Erasable and Programmable ROM (EPROM), an Electrically Erasable and Programmable ROM (EEPROM), a mask ROM, a flash ROM, a NAND flash memory, a NOR flash memory).

According to an embodiment of the present invention, the internal memory 332 may be a Solid State Drive (SSD). The external memory 334 may further include a flash drive, for example, a Compact Flash (CF) card, a Secure Digital (SD) card, a Micro Secure Digital (Micro-SD) card, a mini secure digital (Mini-SD) card, an eXtreme digital (xD) card, or a memory stick. The external memory 334 may be functionally connected to the electronic device 301 through various types of interfaces. According to an embodiment of the present invention, the electronic device 301 may further include a storage (or storage medium), such as a hard drive.

The sensor module 340 measures a physical amount or detects an operational state of the electronic device 301 and convert measured or detected information to electric signals. The sensor module 340 includes, for example, a gesture sensor 340A, a gyro sensor 340B, a barometer 340C, a magnetic sensor 340D, an acceleration sensor 340E, a grip sensor 340F, a proximity sensor 340G, a color sensor 340H (e.g., a RGB (red-green-blue) sensor), a biometric sensor 340I, a temperature/humidity sensor 340J, an illumination sensor 340K, and an Ultra Violet (UV) sensor 340M. Additionally or alternatively, the sensor module 340 may include, for example, an E-nose sensor, an ElectroMyoGraphy (EMG) sensor (not illustrated), an ElectroEncephaloGram (EEG) sensor, an ElectroenCephaloGram (ECG) sensor, an InfraRed (IR) sensor, an iris sensor, or a fingerprint sensor. The sensor module 340 may further include a control circuit for controlling at least one sensor included therein.

The input device 350 includes a touch panel 352, a pen sensor 354 (e.g., a digital pen sensor), a key 356, and an ultrasonic input device 358. The touch panel 352 may detect a touch input by using at least one of a capacitive sensing method, a resistive sensing method, an infrared sensing method, and an ultrasonic sensing method, for example. The touch panel 352 may further include a control circuit. When the touch panel detects a touch using the capacitive sensing method, physical contact or proximity detection is possible. The touch panel 352 may further include a tactile layer. In this case, the touch panel 352 may provide a tactile response to a user.

The pen sensor 354 may be implemented, for example, through the same and/or similar method as that of receiving a user's touch input, and/or by using a separate sheet for detection. For example, the key 356 may include a physical button, an optical key, or a key pad. The ultrasonic input device 358 allows the electronic device 301 to detect sound waves using a microphone 388 and identify data, through an input unit for generating an ultrasonic signal, and may be capable of wireless detection. According to an embodiment of the present invention, the electronic device 301 may receive a user input from an external device (for example, a computer or a server) connected thereto by using the communication module 320.

The display 360 (e.g., the display 250) may include a panel 362, a hologram device 364, or a projector 366. For example, the panel 362 may be, for example, a Liquid Crystal Display (LCD) panel or an Active-Matrix Organic Light-Emitting Diode (AM-OLED) panel. The panel 362 may be implemented to be, for example, flexible, transparent or wearable. The panel 362 and the touch panel 352 may be configured as one module. The hologram device 364 displays a three-dimensional image in the air using interference of light. The projector 366 projects light onto a screen and display an image. The screen may be disposed inside or outside the electronic device 301. According to an embodiment of the present invention, the display 360 may further include a control circuit for controlling the panel 362, the hologram device 364, or the projector 366.

The interface 370 may include, for example, a High-Definition Multimedia Interface (HDMI) 372, a Universal Serial Bus (USB) 374, an optical interface 376, or a D-sub-miniature (D-sub) 378. For example, the interface 370 may be included in the communication interface 260 illustrated in FIG. 2. Additionally or alternatively, the interface 370 may include, for example, a Mobile High-definition Link (MHL) interface, a Secure Digital (SD) card/Multi-Media Card (MMC) interface or an InfraRed Data Association (IrDA)-compliant interface.

The audio module 380 performs bidirectional conversion between sound and electric signals. At least one element of the audio module 380 may be included in, for example, the input/output interface 240 illustrated in FIG. 2. The audio module 380 processes sound information input or output through a speaker 382, a receiver 384, an earphone 386, or a microphone 388. The camera module 391 is a device for capturing a still image or a moving image. According to an embodiment of the present invention, the camera module 391 includes one or more image sensors (e.g., a front sensor or a rear sensor), a lens, an Image Signal Processor (ISP), or a flash (for example, an LED or a xenon lamp).

The power management module 395 manages power of the electronic device 301. Although not illustrated, the power management module 395 may include, for example, a Power Management Integrated Circuit (PMIC), a charger Integrated Circuit (IC), or a battery gauge.

The PMIC may be mounted in, for example, an integrated circuit or an SoC semiconductor. A charging method used for the electronic device 301 may include a wired charging method and a wireless charging method. The charger IC may charge a battery and prevent an overvoltage or overcurrent from being applied from a charger. According to an embodiment of the present invention, the charger IC may include a charger IC for at least one of a wired charging method and a wireless charging method. The wireless charging method may include, for example, a magnetic resonant coupling method, an inductive coupling method, or an ElectroMagnetic (EM) radiation method. An additional circuit for wireless power transfer, for example, a coil loop, a resonant circuit, or a rectifier may be further included.

The battery gauge may measure, for example, a remaining power of the battery 396, or a voltage, a current, a temperature during charging. The battery 396 may store and/or generate electricity, and supply power to the electronic device 301 by using the stored or generated electricity. The battery 396 may include, for example, a rechargeable battery or a solar battery.

The indicator 397 indicates a specific state of the electronic device 301 or a state of a part (e.g., the AP 310) of the electronic device 301, for example, a booting state, a messaging state, or a charging state. The motor 398 converts an electrical signal to a mechanical vibration. Although not illustrated, the electronic device 301 may include a processing device (e.g., a Graphics Processing Unit (GPU)) for supporting a mobile TV. The processing device for supporting a mobile TV may process standard-compliant media data, such as Digital Multimedia Broadcasting (DMB) data, Digital Video Broadcasting (DVB) data, or media flow data.

Each of the above-described elements of the electronic device according to the various embodiments of the present invention may be configured by one or more components and the name of each element may vary depending on the type of an electronic device. An electronic device according to the various embodiments of the present invention may be configured by including at least one of the above-described elements, and some elements may be omitted from or additional element may be further included in the electronic device. In addition, some of the elements of an electronic device according to various embodiments of the present invention are combined into one entity to perform functions of relevant elements before combination.

FIGS. 4A to 4D are diagrams illustrating examples of a surface touch and a hovering touch on a capacitive touch screen panel according to various embodiments of the present invention.

FIG. 4A illustrates a scenario in which there is no user input on a touchscreen panel. In this case (for example, there is no touch), pulse signals transmitted by a transmitter (Tx) 420 of a transmission-side are received at a first degree (e.g., all pulse signals are received) by a receiver 410 of a reception side (Rx). Therefore, a voltage (e.g., V_coup.=about 1.0 V) between the transmitter of the transmission side 420 and the receiver of the reception side 410 are detected at a specified (e.g., a preset) first reference voltage (e.g., V_ref.=about 1.0 V).

However, as illustrated in FIG. 4B, when the user 430 provides a surface touch input, pulse signals transmitted from the transmitter of the transmission side are received at a second degree (e.g., some pulse signals are received) by the receiver of the reception side. In this regard, since some of the pulse signals transmitted from the transmitter are led to a touch input (for example, a touched finger of the user, or a touched electronic pen), the pulse signals are received at the second degree by the receiver. In this case, for example, the first degree may be larger than the second degree. Therefore, a voltage (for example, V_coup.=about 0.5 V) between the transmitter of the transmission side 420 and the receiver of the reception side 410 may be detected at a voltage lower than the specified (for example, preset) first reference voltage (for example, V_ref.=about 1.0 V). For example, the touch screen panel may determine occurrence of a user input by detecting that a voltage lower than the specified first reference voltage is generated.

However, as illustrated in FIG. 4C, when the user 430 provides a hovering touch, pulse signals transmitted from the transmitter of the transmission side are received at a third degree (e.g., some pulse signals are received) by the receiver of the reception side. In this regard, since some of the pulse signals transmitted from the transmitter are led to a hovering touch input (for example, a touched finger of the user, or a touched electronic pen), the pulse signals are received at the third degree by the receiver. In this case, for example, the third degree is less than the second degree and greater than the second degree. Therefore, a voltage (e.g., V_coup.=about 0.25 V) between the transmitter of the transmission side 420 and the receiver of the reception side 410 is detected at a voltage lower than a specified (for example, preset) second reference voltage (e.g., V_ref.=about 0.5 V). For example, the touch screen panel determines whether a hovering touch input has occurred by detecting whether a voltage lower than the specified second reference voltage is generated.

For example, as illustrated in FIG. 4D, a voltage between the transmitter of the transmission side and the receiver of the reception side may be detected at a voltage lower than the reference voltage (e.g., V_ref.=about 1.0 V). The voltage between the transmitter of the transmission side and the receiver of the reception side is referred to as a coupling voltage. In particular, a coupling voltage falling from the reference voltage is referred to as a falling coupling voltage (V_fall.). For example, when the user performs a surface touch on the touch screen panel, the falling coupling voltage may be detected at V_fall.=about −0.5 V. However, when the user performs a hovering touch on the touch screen panel in a non-contact state, the falling coupling voltage may be detected at V_fall.=about −0.25 V.

A graph illustrated in FIG. 4D represents a falling coupling voltage detected when a surface touch or a hovering touch occurs. When there is no user input, the falling coupling voltage is not generated, and when one of the surface touch and the hovering touch is input, the falling coupling voltage is generated. Furthermore, an amplitude of the falling coupling voltage generated when the surface touch occurs is greater than an amplitude of the falling coupling voltage generated when the hovering touch occurs.

Since the amplitude of the falling coupling voltage detected due to the hovering touch is less than the amplitude of the falling coupling voltage detected due to the surface touch, a touch detection sensitivity for detection of a user input on the touch screen panel may be changed. For example, in order to detect the hovering touch of the touch screen panel, the touch detection sensitivity of the touch screen panel may be increased. Since a voltage generated in a receiver of the touch screen panel increases, power consumption may increase. Also, when a touch detection sensitivity of the full area of the touch screen panel is adjusted to increase, the power consumption may rapidly increase.

The electronic device according to various embodiments of the present invention may include a touch screen panel that detects a surface touch and a hovering touch, and a processor that adjusts a detection sensitivity of the touch screen panel. The processor may set a partial area that is at least a part of a touch detection area corresponding to a user interface object based on information on the user interface object to be displayed on the touch screen panel and adjust a detection sensitivity of the partial area to be greater than a detection sensitivity set for the touch screen panel.

FIG. 5 is a diagram illustrating an example of a configuration of hovering touch detection control information according to various embodiments of the present invention.

Referring to FIGS. 2 and 5, the processor 220 compares the acquired information with screen context information of hovering touch detection control information stored in the electronic device and determining a screen context to be displayed on the touch screen panel. The screen context may mean a situation in which, for example, a text message title, a progress bar, or a speed dial is displayed as a user interface object on a display.

According to an embodiment of the present invention, the hovering touch detection control information includes at least one of screen context information for respective operations, hovering touch detection area information, and touch detection sensitivity information. In this regard, the control information is stored in association with respective entries (e.g., screen context 1, screen context 2, screen context 3, and the like).

For example, the screen context information may include a text message preview operation 500, a progress preview operation 510, or a speed dial preview operation 520. For example, the hovering touch detection area information may correspond to areas in which at least one of a text message title, a progress bar, and a speed dial is displayed on a display functionally connected to the electronic device.

Also, the hovering touch detection area information may be stored as position coordinate values (e.g., X, Y) for specifying an area of the touch screen panel. For example, the touch detection sensitivity information is an adjusted value used to adjust a touch detection sensitivity of the hovering touch detection area to be greater than a touch detection sensitivity of the remaining area. For example, when the touch detection sensitivity of a remaining area that is not selected as the hovering touch detection area is 100%, the touch detection sensitivity of the hovering touch detection area may be stored as an adjusted value exceeding 100%. For example, the touch detection sensitivity information may be set as different adjusted values depending on screen contexts. For example, when a first screen context corresponding to the text message preview operation, the touch detection sensitivity is set to 150%, and when a second screen context corresponds to the progress preview operation, the touch detection preview may be set to 180%.

According to an embodiment of the present invention, a third area (area 3) having the most importance from among hovering touch detection areas of the second screen context may be set to 200%. Also, the touch detection sensitivity information may be set to different adjusted values according to a finger mode or a pen mode. For example, since an accuracy of a hovering touch when a user uses a finger may be lower than an accuracy of a hovering touch when the user uses a pen, the touch detection sensitivity in the finger mode may be set to greater than the touch detection sensitivity of the pen mode by 10%, and also vice versa.

According to an embodiment of the present invention, the hovering touch detection control information may be changed (for example, updated) when a new screen context is generated due to an application program. For example, the hovering touch detection control information may be managed in the form of a look up table which the processor 220 always refers to as reference data. Therefore, it is possible to search the control information for hovering touches in real time.

Figure 6:
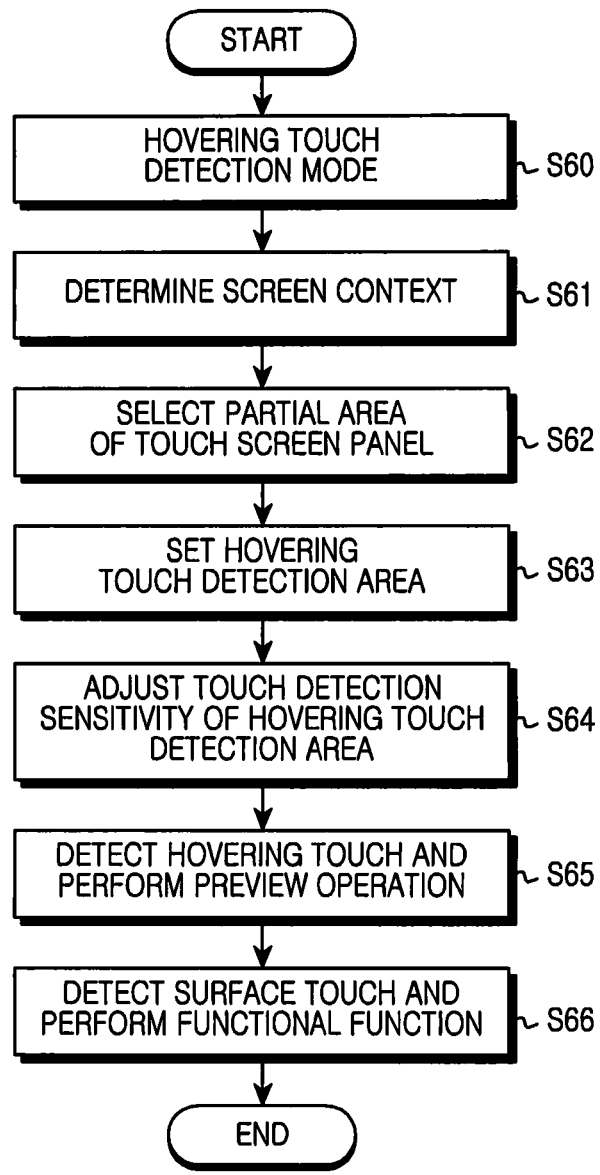
FIG. 6 is a diagram illustrating an operation flowchart of a method for detecting a user input in an electronic device according to various embodiments of the present invention.

FIG. 6 is a diagram illustrating an operation flowchart of a method for detecting a user input in an electronic device according to various embodiments of the present invention.

Referring to FIGS. 2 and 6, the processor 220 may set a hovering touch detection mode in which a surface touch and a hovering touch both are all detected or a surface touch detection mode in which a surface touch is only detected, through a user interface. The surface touch detection mode is for setting a uniform detection sensitivity for the full area of the touch screen panel, and the hovering touch detection mode is for increasing a detection sensitivity of a portion of the touch screen panel to accurately detect a hovering touch.

For example, the processor 220 sets the hovering touch detection mode for detecting a user input on the touch screen panel, in step S60. The hovering touch detection mode may be set for each application or each application operation. In this regard, the electronic device may an operation state of an application program which is being executed.

In step S61, the processor 220 searches the hovering touch detection control information stored in a non-volatile memory or the like and determine a screen context corresponding to a current operation state. For example, when an application program that is currently being executed is a text messaging program, and a current operation is the text message preview operation, the processor 220 searches the hovering touch detection control information and determines a screen context to be displayed on the touch screen panel as the first screen context (i.e., screen context 1).

In step S62, the processor 220 searches position coordinate values of a hovering touch detection area associated with the first screen context and selects a partial area of the touch screen panel. In step S63, the processor 220 sets the area as a hovering touch detection area. In step S64, the processor 220 searches adjusted values of a touch detection sensitivity associated with the first screen context and adjust the touch detection sensitivity of the hovering touch detection area to be greater than the touch detection sensitivity of the remaining area.

When the hovering touch detection area is set according to the first screen context and the touch detection sensitivity of the hovering touch detection area increases as described above, the processor 220 performs a hovering touch detection operation for detecting whether the finger of the user, the pen, or the like is proximate to the touch screen panel. In step S65, when a hovering touch is detected, the processor 220 performs a preview operation corresponding to an area in which the hovering touch is detected in step S65. Thereafter, in step S66, when a surface touch is detected, the processor 220 performs a functional operation corresponding to the area in which the surface touch is detected.

Figure 7:
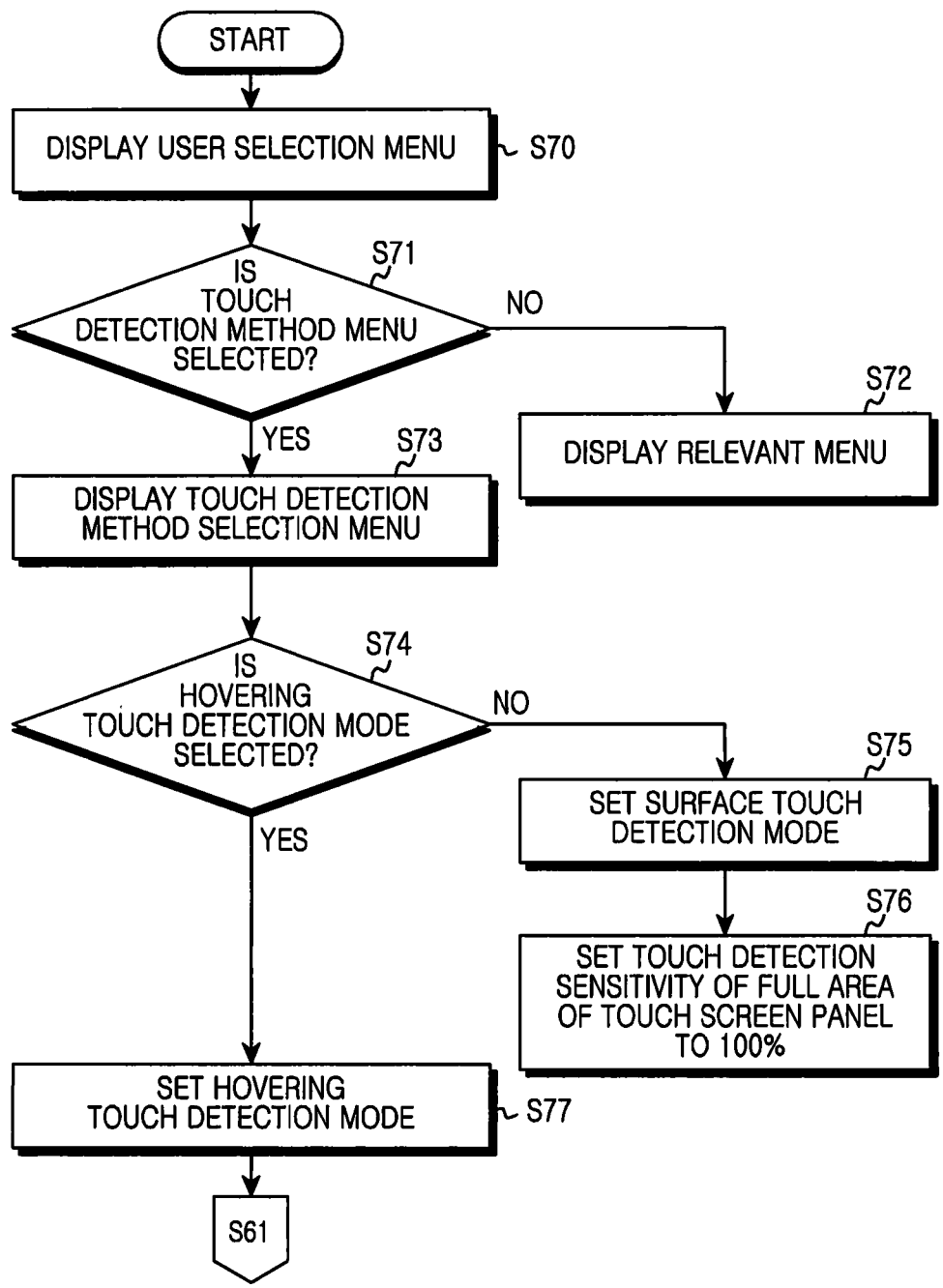
FIG. 7 is a diagram illustrating a process for setting a hovering touch detection mode according to various embodiments of the present invention.

FIG. 7 is a flowchart illustrating a process for setting a hovering touch detection mode according to various embodiments of the present invention.

Referring to FIG. 7, in step 70, the processor 220 displays a user selection menu screen through the display 250, according to a user's request or the like. In step 71, whether the user selects a touch detection method menu may be determined.

When it is determined that the touch detection method menu is not selected, the processor 220 displays a menu selected by a user in step S72. When it is determined that the touch detection method menu is selected, the processor 220 displays a touch detection method selection menu in step S73. Thereafter, in step S74, it may be determined whether a hovering touch detection mode is selected. When it is determined that the hovering touch detection mode is not selected, the processor 220 sets a surface touch detection mode in step S75, and sets a touch detection sensitivity of the full area of a touchscreen panel to a specified value (for example, 100%) in step S75.

However, when it is determined that the hovering touch detection mode is selected, the processor 220 sets the hovering touch detection mode in step S77. More specifically, the user may select at least one of the surface touch detection mode and the hovering touch detection mode through a user interface. For example, when the surface touch detection mode is selected, the processor 220 adjusts the touch detection sensitivity of the full area of the touch-screen panel to the specified (for example, previously-set) value (for example, 100%). However, when the hovering touch detection mode is selected, a subsequent operation for determining a screen context may be performed.

Figure 8:
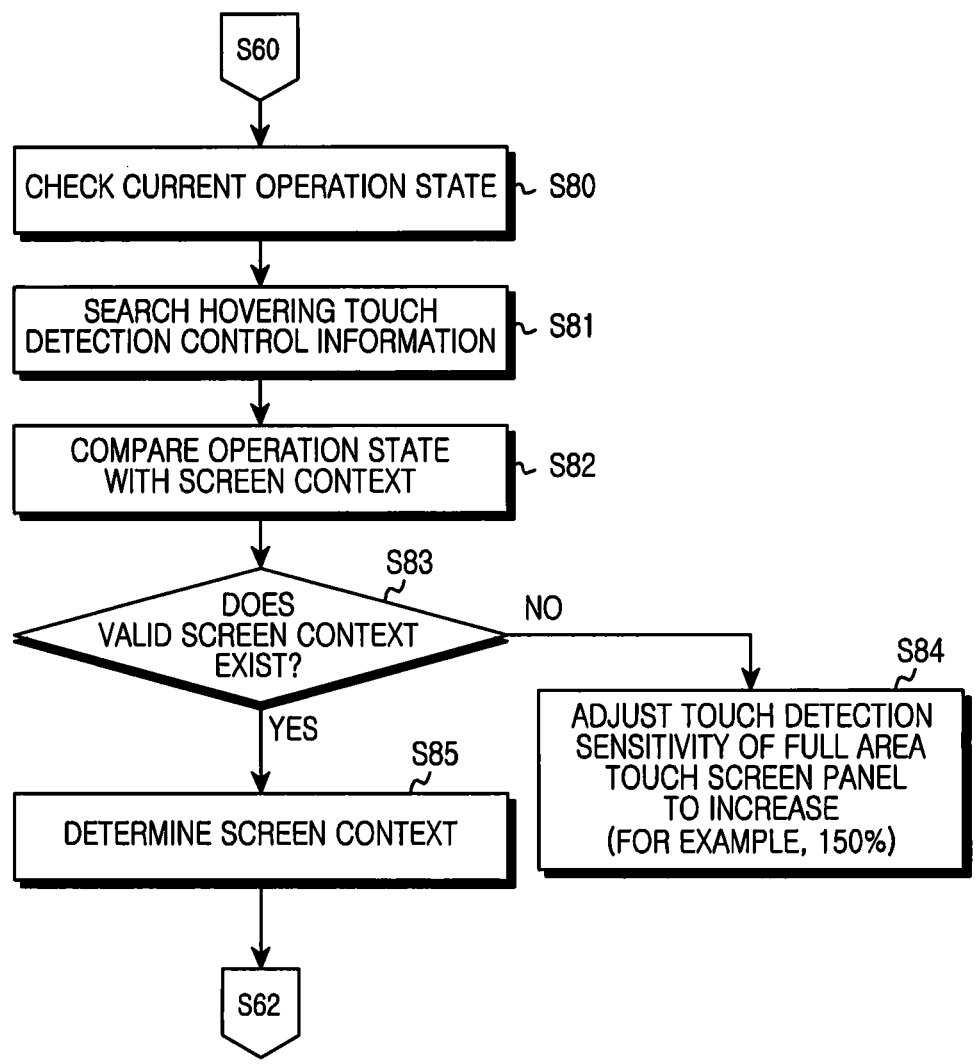
FIG. 8 is a diagram illustrating a process for determining a screen context according to various embodiments of the present invention.

FIG. 8 is a flowchart illustrating a process for determining a screen context according to various embodiments of the present invention.

Referring to FIG. 8, in step S80, when a certain application program is executed in a state in which a hovering touch detection mode is set, the processor 220 checks an operation state of the application program. In step S81, control information of a hovering touch associated with an operation of the application program is searched. For example, when a text messaging application program is executed, and a current operation is a text message preview operation, the processor 220 searches hovering touch detection control information, and compares the text message preview that is the current operation with screen contexts stored in the hovering touch detection control information in step S82.

In step S83, the processor 220 determines whether a valid screen context corresponding to the text message preview exists in the hovering touch detection control information as a comparison result. When it is determined that the valid screen context does not exist, the processor 220 adjusts a touch detection sensitivity of the full area of a touchscreen panel to be greater than a touch detection sensitivity of a surface touch detection mode in step S84. For example, when a screen context does not exist in the hovering touch detection control information, the touch detection sensitivity of the full area of the touchscreen panel is increased, thereby preventing an error from occurring in the hovering touch detection operation.

However, when it is determined that the valid screen context exists, the processor 220 determines a first screen context corresponding to the text message preview operation as a screen context to be displayed on the touchscreen panel.

Figure 9:
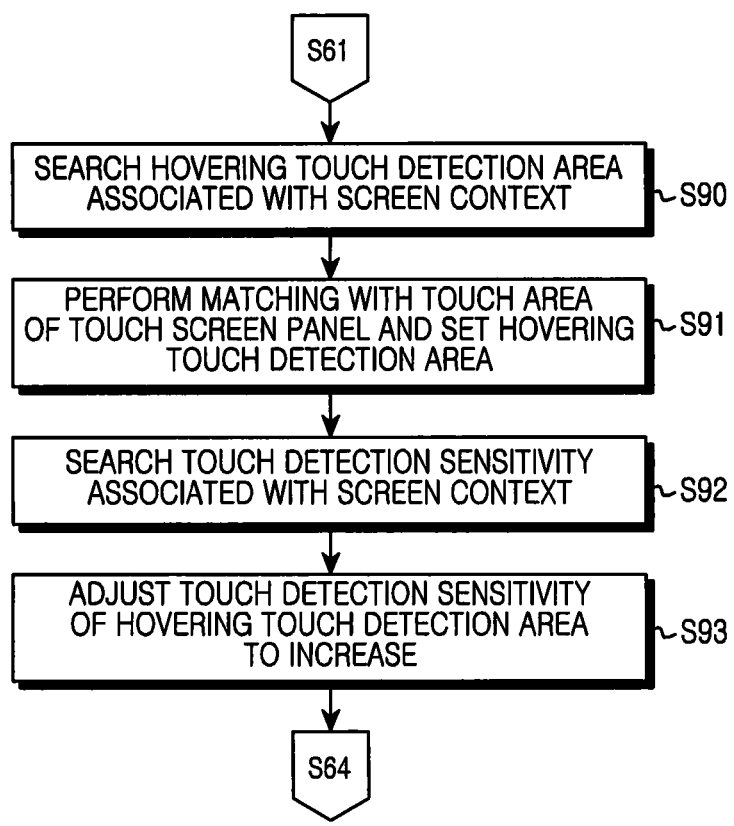
FIG. 9 is a diagram illustrating a process for setting a hovering touch detection area and adjusting a touch detection sensitivity according to various embodiments of the present invention.

FIG. 9 is a diagram illustrating a process for setting a hovering touch detection area and adjusting a touch detection sensitivity according to various embodiments of the present invention.

Referring to FIG. 9, in step S90, the processor 220 determines whether there is hovering touch control information associated with the screen context. When the screen context exists in the hovering touch control information, the processor 220 searches for a hovering touch detection area of the hovering touch control information associated with the screen context.

For example, when a first screen context (i.e., screen context 1) corresponding to the text message preview operation is found, the processor 220 searches for position coordinate values of the hovering touch detection area (area 1, area 2, area, 3, . . . ) associated with the first screen context and sets the position coordinate values as the hovering touch detection area by matching the position coordinate values with a touch area of the touchscreen panel.

In step S92, the processor 220 detects a touch detection sensitivity associated with the first screen context. Thereafter, in step S93, the processor 220 applies the touch detection sensitivity to the hovering detection area and adjusts a touch detection sensitivity to be greater than a touch detection sensitivity of the remaining area. For example, assuming that a touch detection sensitivity of an area that is not set as the hovering touch detection area is 100%, the touch detection sensitivity of the hovering touch detection area is adjusted to an adjusted value exceeding 100% (e.g. 150%).

According to an embodiment of the present invention, the processor 220 may differently set the touch detection sensitivity according to whether a user uses his or her finger or uses a pen. For example, when the user uses his or her finger, the touch detection sensitivity may be adjusted to 150%. When the user uses a pen, the touch detection sensitivity may be adjusted to 140%.

According to an embodiment of the present invention, the pen may be an electronic pen that allows the touchscreen panel to detect a pen touch. The touch detection sensitivity may be set to an adjusted value of percentage (%) or an adjusted value of a specific value for adjusting an amplification voltage of the receiver of the reception side (Rx) and the adjusted value may be set to a result value of a test. According to an embodiment of the present invention, the touch detection sensitivity for the hovering touch detection area may be differently applied according to importance of the hovering touch detection area or the like.

Furthermore, a touch sensitivity of the surface touch detection area may be reduced so as to increase the touch detection sensitivity of the hovering touch detection area to be greater than a touch detection sensitivity of the touch screen panel. For example, the touch detection sensitivity of the touch screen panel is set to 150%, the touch sensitivity of the hovering touch detection area is maintained at 150% and a touch sensitivity of the surface touch detection area that is the remaining other area is reduced to 100%, thereby reducing power consumption.

Figure 10:
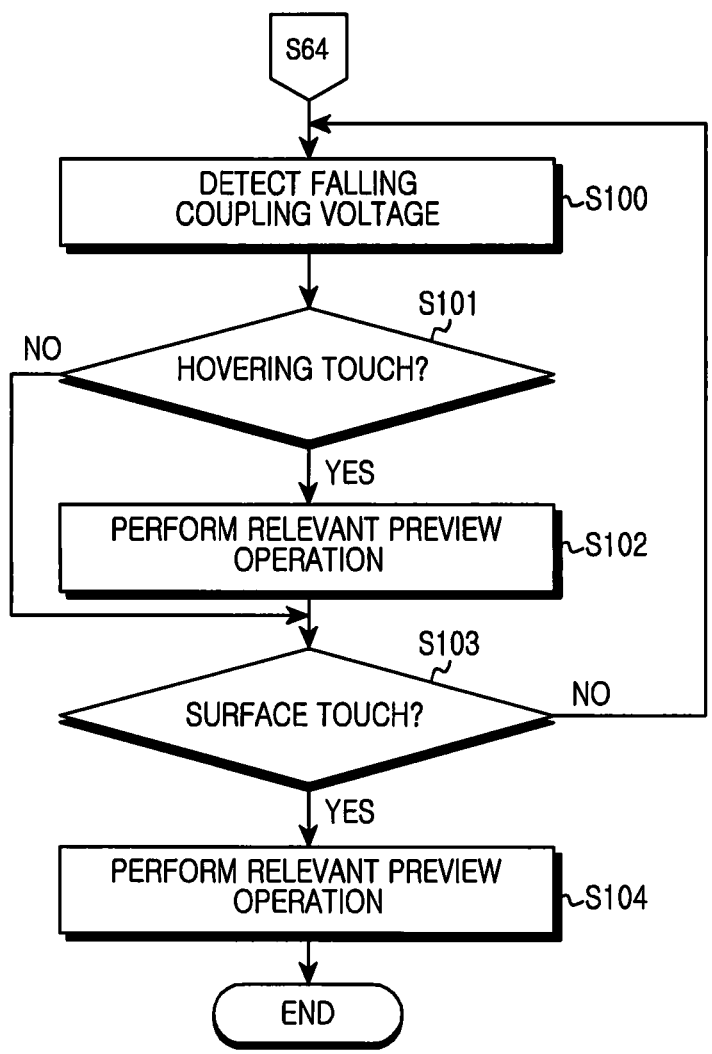
FIG. 10 is a diagram illustrating a process for detecting a hovering touch and a surface touch according to various embodiments of the present invention.

FIG. 10 is a diagram illustrating a process for detecting a hovering touch and a surface touch according to various embodiments of the present invention.

Referring to FIG. 10, in step S100, the processor 220 selects and sets a partial area of the touch screen panel as a hovering touch detection area, and detects a falling coupling voltage of a reception-side (Rx) receiver in a state in which the touch detection sensitivity has been increased.

The falling coupling voltage is a detected value corresponding to a user input. When a falling coupling voltage in a preset reference range (e.g., about 0.25 V to 1.0 V) is detected in a certain hovering touch detection area, this detected falling coupling voltage may be interpreted as corresponding to a hovering touch or a surface touch. For example, when the falling coupling voltage in the range of about 0.25 V to 0.45 V is detected, this falling coupling voltage may be determined as a hovering touch. When the falling coupling voltage in the range of about 0.46 V to 1.0 V is detected, this falling coupling voltage may be determined as a surface touch.

When it is determined that a hovering touch is detected in step S101, the processor 220 performs a preview operation corresponding to the hovering touch detection area in step S102. When the hovering touch is not detected in step S101, the processor 220 determines whether a surface touch is detected, in step S103. When it is determined that a surface touch is detected, the processor 220 performs a functional operation corresponding to the hovering touch detection area, in step S104.

For example, in a state in which a plurality of text message titles are displayed in the form of a list on the touch screen panel, when a certain text message title is selected by a user through a hovering touch, the processor 220 may briefly display a relevant text message in a preview state. When the certain text message title is selected by the user through a surface touch, the processor 220 may display entire content of the text message. Therefore, the user may check brief information of the message as a preview through the hovering touch and check entire information of the message in detail through the surface touch.

Figure 11:
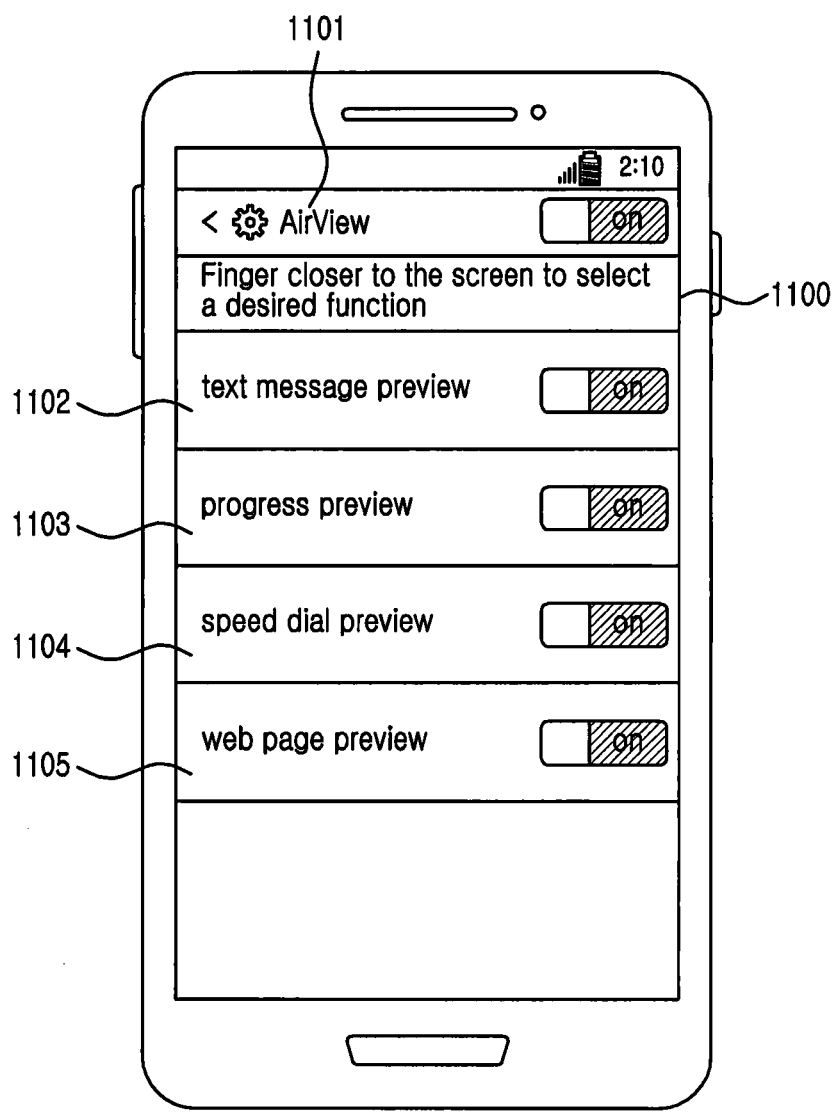
FIG. 11 is a diagram illustrating an airview setting menu screen according to various embodiments of the present invention.

FIG. 11 is a diagram illustrating an example of a setting menu screen according to various embodiments of the present invention.

Referring to FIG. 11, according to an embodiment of the present invention, the setting menu screen 1100 allows for setting the hovering touch detection mode. For example, the setting menu screen 1100 allows a user to set a mode for performing a preview operation by using the hovering touch. The mode for performing a preview operation by using the hovering touch may be referred to as airview 1101. Also, the mode for performing a preview operation by using the hovering touch may be referred to as a hovering preview or a hoverview, for example.

According to an embodiment of the present invention, a user is able to set whether to use the hovering touch detection mode or whether to use a hovering touch for operation of an application program through a user interface. For example, the electronic device may display the setting menu screen (for example, an airview setting menu screen). On the airview setting menu screen 1100, at least one of a text message preview 1102, a progress preview 1103, a speed dial preview 1104 and a web page preview 1105 may be displayed. Also, on the airview setting menu screen 1100, on/off buttons for allowing the user to select whether to use a hovering touch for operations of respective application programs may be displayed.

For example, when the user turns off a preview operation by using the on/off button, the processor 220 performs only a surface touch detection operation without performing a hovering touch detection operation. However, when the user turns on an airview operation and turns off a text message preview operation by using the on/off button, the processor 220 performs the surface touch detection operation without performing the hovering detection operation when performing the text message preview operation 1102. More specifically, the user may turn on/off the hovering touch detection operation through the airview setting menu screen, and selectively apply the hovering touch detection operation only to a desired mode.

Figure 12:
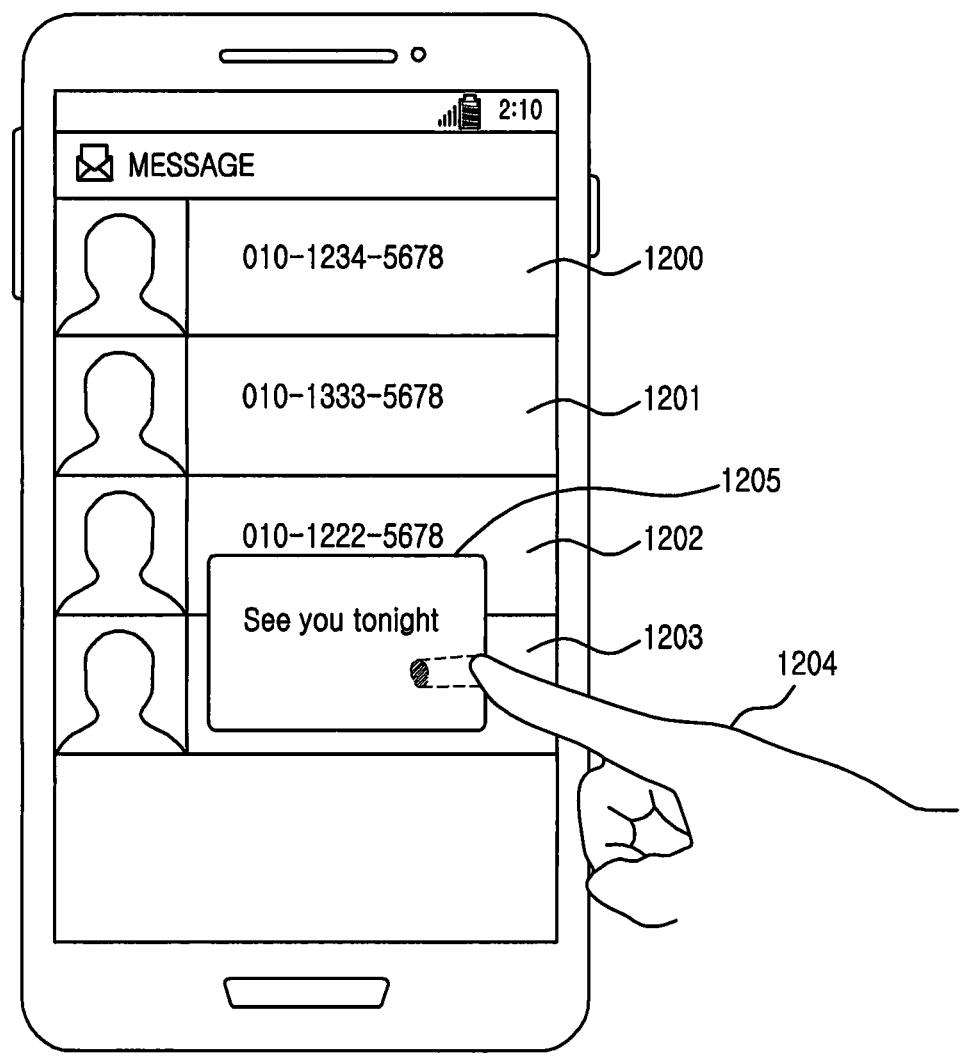
FIG. 12 is a diagram illustrating a text message preview operation according to various embodiments of the present invention.

FIG. 12 is a diagram illustrating an example of a text message preview operation according to various embodiments of the present invention.

Referring to FIG. 12, according to an embodiment of the present invention, a detection sensitivity of a hovering touch may be changed in a text message preview operation. For example, when a first screen context corresponding to the text message preview operation as illustrated in FIG. 12, it is possible to select and set areas 1200, 1201, 1202, and 1203, on which respective text message titles are displayed, as hovering touch detection areas. Thereafter, the touch detection sensitivity of the hovering touch detection areas may be adjusted to be greater than that of the remaining area. When the user 1204 selects a certain text message title and performs the hovering touch, the content of a relevant text message is briefly displayed in a preview form 1205.

Figure 13:
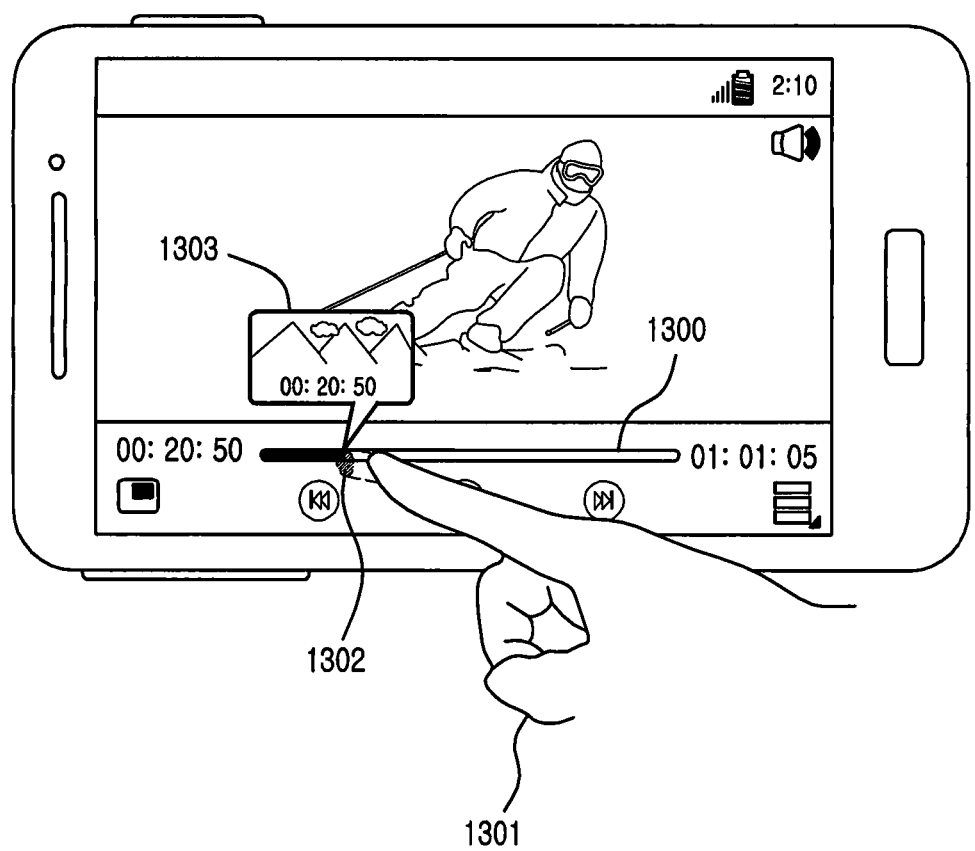
FIG. 13 is a diagram illustrating a progress preview operation according to various embodiments of the present invention.

FIG. 13 is a diagram illustrating an example of a progress preview operation according to various embodiments of the present invention.

Referring to FIG. 13, for example, when a second screen context corresponding to a progress preview operation is displayed, the processor 220 selects and set an area in which a progress bar 1300 having a horizontal length is displayed as a hovering touch detection area, and adjusts a touch detection sensitivity thereof to be greater than that of the remaining area. When the user 1301 selects a certain position 1302 of the progress bar and performs the hovering touch, a thumbnail picture 1303 representing the position is briefly displayed in a preview form.

Figure 14:
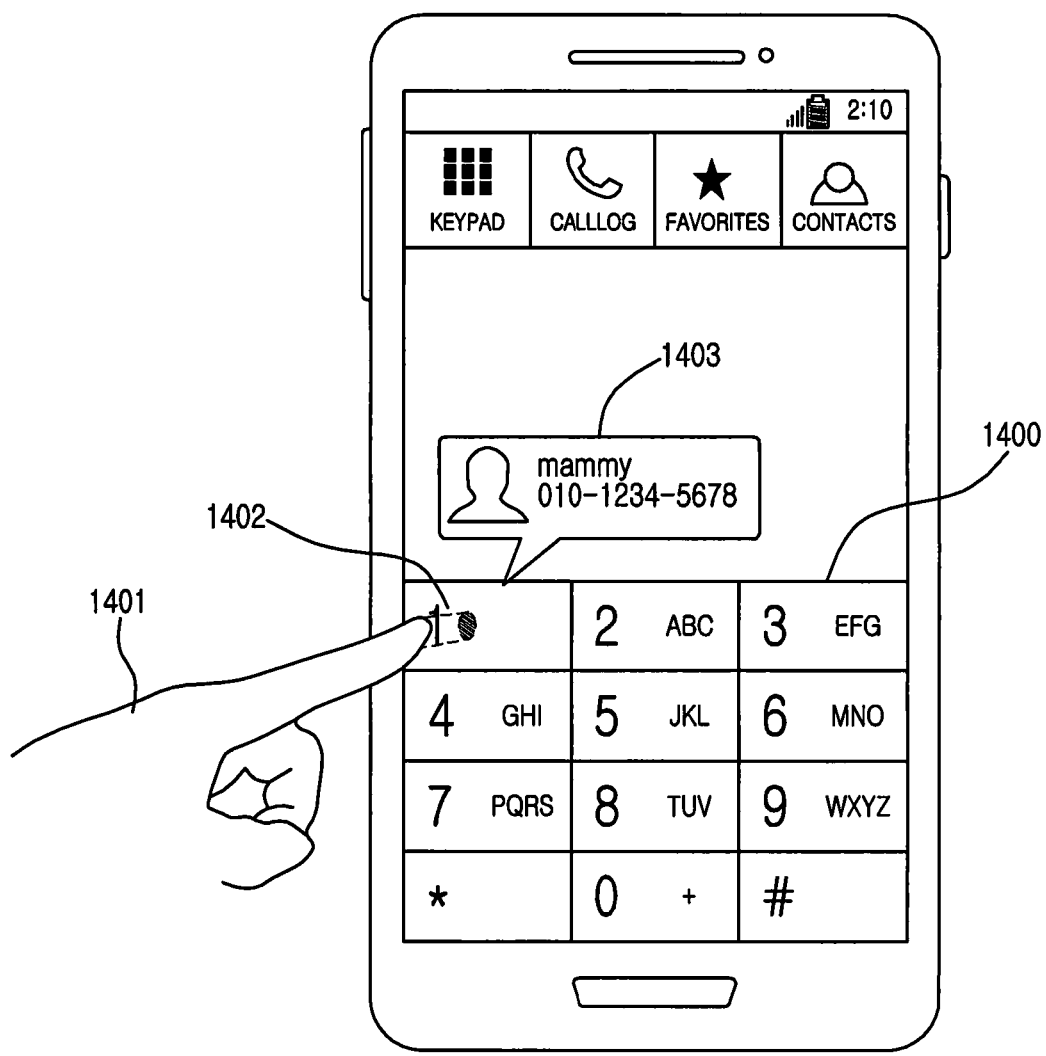
FIG. 14 is a diagram illustrating a speed dial preview operation according to various embodiments of the present invention.

FIG. 14 is a diagram illustrating an example of a speed dial preview operation according to various embodiments of the present invention.

Referring to FIG. 14, for example, as illustrated in FIG. 14, when a third screen context corresponding to the speed dial preview operation is displayed, the processor 220 selects and set areas in which speed dials 1400 are displayed as hovering touch detection areas, and adjusts a touch detection sensitivity thereof to be greater than that of the remaining area. When the user 1401 selects a certain speed dial 1402 and performs the hovering touch, the processor 220 briefly displays a person's name and a phone number associated with the speed dial, in a preview form 1403. Therefore, the user is able to easily check desired information in a preview form by using a hovering touch.

A method for operating an electronic device according to various embodiments of the present invention includes acquiring information on a user interface object to be displayed on a touch screen panel, setting a partial area that is at least a part of a touch detection area corresponding to the user interface object based on the information, and adjusting a touch detection sensitivity of the partial area to be greater than a touch detection sensitivity of the touch screen panel.

The electronic device according to various embodiments of the present invention selects a partial area of the touch screen panel and adjusts a touch detection sensitivity thereof to increase, thereby reducing power consumption while detecting a hovering touch. Furthermore, it is possible to adjust a touch detection sensitivity of a hovering touch detection area to different values depending on the importance of the hovering touch detection area. Furthermore, it is possible to adjust a touch detection sensitivity of a hovering touch detection area to different values according to a finger mode and a pen mode to accurately detect a hovering touch.

The term "module" as used herein may refer to a unit including one or a combination of two or more among, for example, hardware, software and firmware. The "module" may be used interchangeably with, for example, the term "unit", "logic", "logical block", "component", or "circuit". The "module" may be a smallest unit or part of an integrally formed component. The "module" may be a smallest unit or a part thereof which performs one or more functions. The "module" may be implemented mechanically or electronically. For example, the "module" according to the various embodiments of the present invention may include an Application-Specific Integrated Circuit (ASIC) chip, a Field Programmable Gate Array (FPGA), or a programmable-logic device.

According to the various embodiments of the present invention, at least a part of an apparatus (for example, modules or functions thereof) or a method (for example, operations) according to embodiments of the present invention may be implemented by an instruction stored in a computer-readable storage media as a programming module for example. When the instructions are executed by one or more processors (e.g., the processor 220), the processor performs functions corresponding to the instructions. The computer-readable storage media may be, for example, the memory 230. At least a part of the programming module may be implemented or executed by the processor 220 for example. At least a part of the programming module may include, for example, a module, a program, a routine, a set of instructions and/or a process which performs one or more functions.

Examples of the computer-readable recording medium include magnetic media such as hard disks, floppy disks and magnetic tapes, optical media such as Compact Disc-Read-Only Memories (CD-ROMs) and DVDs, magneto-optical media such as floptical disks, and hardware devices such as Read-Only Memories (ROMs), Random Access Memories (RAMs) and flash memories that are especially configured to store and execute program commands (e.g., programming module). The program commands may include machine language codes that may be generated by a compiler, and high-level language codes that may be executed by a computer by using an interpreter. The hardware apparatus may be configured to operate as one or more software modules in order to perform operations according to the various embodiments of the present invention, or vice versa.

Modules or programming modules according to the various embodiments of the present invention may include one or more elements among the above-described elements or emit some elements among the above-described elements, or further include another element. The operations performed by the module, programming module, or another element according to the various embodiments of the present invention may be performed in a sequential manner, a parallel manner, a repetitive manner, or a heuristic manner. Furthermore, some operations may be performed in another order or may be omitted, or other operations may be included, in accordance with embodiments of the present invention.

Various embodiments of the present invention may include a computer-readable recording medium for storing instructions that, when executed by at least one processor, cause the at least one processor to perform at least one operation, the at least one operation including acquiring information on a user interface object to be displayed on a touch screen panel, setting a partial area that is at least a part of a touch detection area corresponding to the user interface object based on the information, and adjusting a touch detection sensitivity of the partial area to be greater than a touch detection sensitivity of the touch screen panel.

While the present invention has been shown and described with reference to certain embodiments thereof, it will be understood by those skilled in the art that various changes in form and details may be made therein without departing from the spirit and scope of the present invention as defined by the appended claims and their equivalents.

What is claimed is:

1. A method for operating an electronic device, the method comprising:
    displaying a screen on which at least one application is executed;
    determining, based on information regarding the at least one application, a state of the displayed screen;
    determining, among reference states stored in the electronic device, a reference state corresponding to the determined state of the displayed screen, the reference state including information regarding an area capable of receiving a hovering input;
    determining the area capable of receiving the hovering input in an entire area of the displayed screen as a first area;
    determining an area other than the first area in the entire area of the displayed screen as a second area; and
    adjusting a detection sensitivity of the determined first area to be greater than a detection sensitivity of the determined second area.

2. The method of claim 1, further comprising displaying, in response to detecting the hovering input on the first area, additional information associated with the at least one application over the displayed screen.

3. The method of claim 1, wherein the information regarding the at least one application comprises at least one of information regarding a type of the at least one application and information regarding a function of the at least one application.

4. The method of claim 1, further comprising displaying a user interface for determining whether or not to adjust the detection sensitivity.

5. The method of claim 1, wherein determining the state of the displayed screen comprises:
    determining, based on the information regarding the at least one application, an operation state of the electronic device; and
    determining, based on the determined operation state of the electronic device, the state of the displayed screen.

6. The method of claim 1, wherein the reference states are included in hovering touch detection control information, and
    wherein the hovering touch detection control information includes at least one of screen context information for respective operations, hovering touch detection area information, and detection sensitivity information stored in association with respective entries.

7. The method of claim 6, wherein the screen context information corresponds to at least one of a text message preview operation, a progress preview operation, and a speed dial preview operation.

8. The method of claim 6, wherein the hovering touch detection area information corresponds to an area in which at least one of a text message title, a progress bar, and a speed dial is displayed.

9. The method of claim 6, wherein the hovering touch detection area information includes at least one position coordinate value for determining the area capable of receiving the hovering input.

10. The method of claim 6, wherein the detection sensitivity information is an adjusted value used to adjust the detection sensitivity of the first area to be greater than the detection sensitivity of the second area.

11. The method of claim 6, wherein the detection sensitivity information includes different adjusted values according to hovering touch detection areas or different adjusted values according to an input mode of the electronic device.

12. An electronic device comprising:
    a touch screen panel configured to detect a touch input and a hovering input; and
    a processor, operatively coupled to the touch screen panel, configured to:
        control to display a screen on which at least one application is executed;
        determine, based on information regarding the at least one application, a state of the displayed screen;
        determine, among reference states stored in the electronic device, a reference state corresponding to the determined state of the displayed screen, the reference state including information regarding an area capable of receiving a hovering input;
        determine the area capable of receiving the hovering input in an entire area of the displayed screen as a first area;
        determine an area other than the first area in the entire area of the displayed screen as a second area; and
        adjust a detection sensitivity of the determined first area to be greater than a detection sensitivity of the determined second area.

13. The electronic device of claim 12, wherein the processor is further configured to control to display, in response to detecting the hovering input on the first area, additional information associated with the at least one application over the displayed screen.

14. The electronic device of claim 12, wherein the information regarding the at least one application comprises at least one of information regarding a type of the at least one application and information regarding a function of the at least one application.

15. The electronic device of claim 12, wherein the processor is further configured to control to display a user interface for determining whether or not to adjust the detection sensitivity.

16. The electronic device of claim 12, wherein the processor is further configured to:
   determine, based on the information regarding the at least one application, an operation state of the electronic device; and
   determine, based on the determined operation state of the electronic device, the state of the displayed screen.

17. The electronic device of claim 12, wherein the reference states are included in hovering touch detection control information, and
   wherein the hovering touch detection control information includes at least one of screen context information for respective operations, hovering touch detection area information, and detection sensitivity information stored in association with respective entries.

18. The electronic device of claim 17, wherein the screen context information corresponds to at least one of a text message preview operation, a progress preview operation, and a speed dial preview operation.

19. The electronic device of claim 17, wherein the hovering touch detection area information corresponds to an area in which at least one of a text message title, a progress bar, and a speed dial is displayed.

20. The electronic device of claim 17, wherein the hovering touch detection area information includes at least one position coordinate value for determining the area capable of receiving the hovering input.

21. The electronic device of claim 17, wherein the detection sensitivity information is an adjusted value used to adjust the touch detection sensitivity of the first area to be greater than the detection sensitivity of the second area.

22. The electronic device of claim 17, wherein the detection sensitivity information includes different adjusted values according to hovering touch detection areas or different adjusted values according to an input mode of the electronic device.

23. A non-transitory computer-readable recording medium that stores a program which, when executed by a computer, performs a method comprising:
   displaying a screen on which at least one application is executed;
   determining, based on information regarding the at least one application, a state of the displayed screen;
   determining, among reference states stored in the electronic device, a reference state corresponding to the determined state of the displayed screen, the reference state including information regarding an area capable of receiving a hovering input;
   determining the area capable of receiving the hovering input in an entire area of the displayed screen as a first area;
   determining an area other than the first area in the entire area of the displayed screen as a second area; and
   adjusting a detection sensitivity of the determined identified-first area to be greater than a detection sensitivity of the determined second area.

* * * * *